United States Patent
Baker

(10) Patent No.: US 7,397,408 B2
(45) Date of Patent: *Jul. 8, 2008

(54) SYSTEM AND METHOD FOR SCHEDULING ACCESS TO AN ANALOG-TO-DIGITAL CONVERTER AND A MICROPROCESSOR

(75) Inventor: David Cureton Baker, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/545,221

(22) Filed: Oct. 10, 2006

(65) Prior Publication Data

US 2007/0035433 A1 Feb. 15, 2007

Related U.S. Application Data

(63) Continuation of application No. 11/416,768, filed on May 3, 2006, now Pat. No. 7,142,141, which is a continuation of application No. 11/171,554, filed on Jun. 30, 2005, now Pat. No. 7,071,859.

(51) Int. Cl.
H03M 1/12 (2006.01)
(52) U.S. Cl. .................... 341/155; 341/156
(58) Field of Classification Search .......... 341/120–170
See application file for complete search history.

(56) References Cited

U.S. PATENT DOCUMENTS

| 5,541,601 | A | 7/1996 | Goto et al. |
| 5,585,796 | A | 12/1996 | Svensson et al. |
| 5,991,686 | A | 11/1999 | Oguro et al. |
| 7,071,859 | B1 * | 7/2006 | Baker .................... 341/141 |
| 7,142,141 | B1 * | 11/2006 | Baker .................... 341/141 |

* cited by examiner

*Primary Examiner*—Lam T Mai
(74) *Attorney, Agent, or Firm*—Toler Law Group

(57) ABSTRACT

An analog-to-digital converter (ADC) system is disclosed and includes a programmable control register and a plurality of channels, each channel having an associated request bit within the programmable control register. The ADC system also includes a scheduler responsive to the programmable control register, the scheduler comprising logic to monitor a plurality of request bits to detect when any of the request bits are set. A method of scheduling analog-to-digital conversion is disclosed and includes receiving a request to schedule an analog-to-digital conversion for a channel of a plurality of channels. The method also includes scheduling an analog-to-digital conversion in response to receiving the request and performing the analog-to-digital conversion based on the request, where data that indicates the request is stored in a programmable control register.

20 Claims, 3 Drawing Sheets

SYSTEM AND METHOD FOR SCHEDULING ACCESS TO AN ANALOG-TO-DIGITAL CONVERTER AND A MICROPROCESSOR

REFERENCE TO RELATED APPLICATIONS

The present application is a continuation application of and claims priority to U.S. patent application Ser. No. 11/416,768 filed on May 3, 2006, the contents of which are expressly incorporated herein by reference in their entirety, which is a continuation application of and claims priority to U.S. patent application Ser. No. 11/171,554 filed on Jun. 30, 2005, now U.S. Pat. No. 7,071,859, the contents of which are expressly incorporated herein by reference in their entirety.

FIELD OF THE DISCLOSURE

The present disclosure relates generally to analog-to-digital converters.

BACKGROUND

Most portable electronic devices require one or more batteries. The batteries can be rechargeable or disposable. Regardless of the type of battery, prolonging the life of the battery life is very important to consumers. A primary reason for decreased battery life is inefficient processor and component usage. For example, if a processor must continually poll individual components for signals, time and resources are wasted. Further, if an analog-to-digital controller having a plurality of channels must continually poll those channels to determine if a conversion is required for any of the channels time and resources are wasted.

As such, an improved system and method for testing scheduling access to an analog-to-digital converter and a microprocessor.

DETAILED DESCRIPTION OF THE DRAWING(S)

Figure 1:
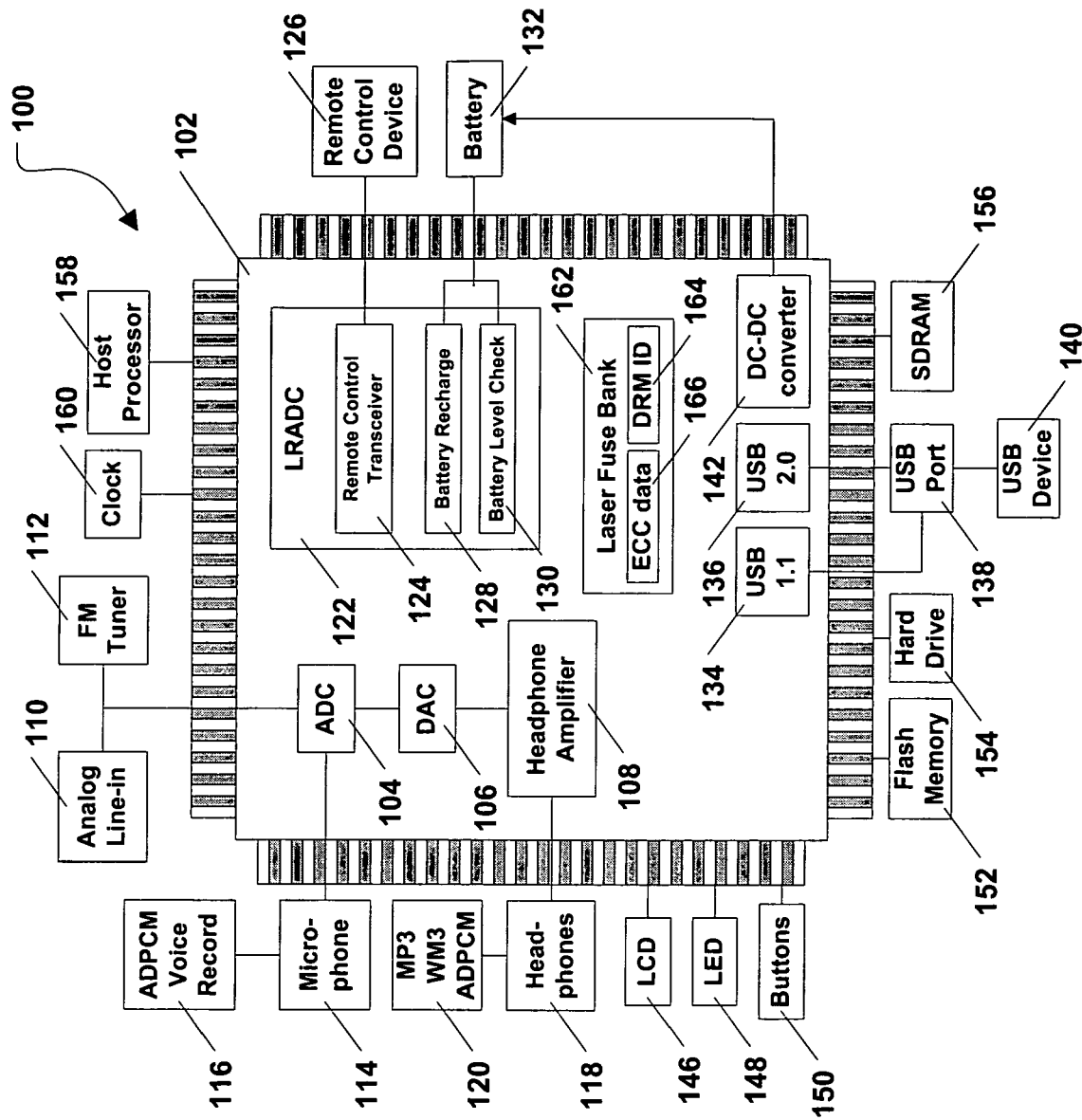
FIG. 1 is a block diagram of a system having a semiconductor device.

A method of scheduling use of an analog-to-digital converter is disclosed and includes writing to a schedule register that has a plurality of schedule bits. Each of the plurality of schedule bits corresponds to a channel of an analog-to-digital converter. Further, the method includes copying the plurality of bits from the schedule register to a request register that has a plurality of request bits. The method also includes monitoring the plurality of request bits and determining whether at least one of the plurality of request bits is set. Additionally, the method includes blocking further copying to the request register after determining that at least one of the plurality of request bits is set.

In a particular embodiment, the method includes setting a channel N to an integer value associated with a lowest request bit that is set. Also, in a particular embodiment, the method includes performing an analog-to-digital conversion for the channel N. In yet another particular embodiment, the method includes resetting a request bit that is associated with the channel N. In still another particular embodiment, the method includes resetting a schedule bit that is associated with the channel N. In another particular embodiment, the method includes setting an interrupt request bit for the channel N. Further, in yet another particular embodiment, the method includes determining whether an additional request bit is set within the request register.

In a particular embodiment, the analog-to-digital converter includes eight channels, the schedule register includes eight schedule bits, and the request register includes eight request bits. Moreover, in a particular embodiment, the eight request bits are monitored successively from a first request bit to an eighth request bit. Further, in a particular embodiment, the analog-to-digital converter is a low resolution analog-to-digital converter. In still another particular embodiment, the analog-to-digital converter has a resolution of twelve bits.

In another embodiment, an analog-to-digital converter system is disclosed and includes a controller, a programmable control register that is coupled to the controller, and a plurality of channels that are coupled to the controller. Each channel includes an associated schedule bit within the programmable control register, an associated request bit within the programmable control register, and an associated interrupt request bit within the programmable control register. Additionally, in this embodiment, a scheduler is coupled to the controller and to the programmable control register. The scheduler can include logic to monitor a plurality of request bits to detect when any of the schedule request bits are set.

In yet another embodiment, a semiconductor device is disclosed and includes a microprocessor and an analog-to-digital converter that is coupled to the microprocessor. In this embodiment, the analog-to-digital converter includes a controller. Further, the analog-to-digital converter includes a schedule register, a request register, and an interrupt request register that are coupled to the controller. Also, a plurality of channels are coupled to the controller. Each channel includes an associated schedule bit within the schedule register, an associated request bit within the request register, and an associated interrupt request bit within the interrupt request register. In this particular embodiment, a scheduler is coupled to the controller and the registers. The scheduler can include logic to copy a plurality of schedule bits to a plurality of request bits, logic to monitor the plurality of request bits, logic to determine whether at least one of the plurality of request bits is set, and logic to block further copying of the schedule bits when at least one of the plurality of request bits is set.

FIG. 1 shows an exemplary, non-limiting embodiment of an audio system, designated 100. In a particular embodiment, the audio system 100 provides an audio decoder system that can be incorporated in an MP3 flash player or an MP3 hard disk drive. In an illustrative embodiment, shown in FIG. 1, the system 100 includes a semiconductor device 102, i.e., an integrated circuit. As shown, an analog-to-digital converter (ADC) 104 is disposed within the semiconductor device 102. A digital-to-analog converter (DAC) 106 is also disposed within the semiconductor device 102 and is coupled to the ADC 104. Additionally, a headphone amplifier 108 is disposed within the semiconductor device 102. The headphone amplifier 108 is also coupled to the DAC 106.

FIG. 1 further shows an analog line-in 110, a frequency modulation (FM) tuner 112, and a microphone 114 that are coupled to the ADC 104. Further an adaptive differential pulse-code modulation (ADPCM) voice recording module 116 is connected to the microphone. As shown in FIG. 1, a set of headphones 118 can be coupled to the headphone amplifier 108. FIG. 1 also shows an audio file 120 that can be listened to via the headphones 118. In a particular embodiment, the audio file 120 can be an MPEG-1/2 Audio Layer 3 (MP3) file, a Windows media audio (WMA) file, or an ADPCM file.

As shown in FIG. 1, a low resolution analog-to-digital converter (LRADC) system 122 can be disposed within the semiconductor device 102. In an illustrative embodiment, the LRADC system 122 includes a remote control transceiver 124 that is coupled to a remote control device 126. Particularly, the remote control transceiver 124 can be coupled to a remote control device 126 via an infrared (IR) connection or a radio frequency (RF) connection. FIG. 1 also shows that the LRADC system 122 can include a battery recharge module 128 and a battery level check module 130 that is coupled to a battery 132, e.g., a rechargeable secondary battery.

FIG. 1 indicates that the semiconductor device 102 can also include a first universal serial bus (USB) driver 134 and a second USB driver 136. In an illustrative embodiment, the first USB driver 134 is a USB 1.1 driver and the second USB driver 136 is a USB 2.0 driver. Further, each USB driver 134, 136 is connected to a USB port 138. A USB device 140 can be coupled to the semiconductor device 102 via the USB port 140. In a particular embodiment, the USB device 140 can be a computer, or any other device with a USB connection.

Still referring to FIG. 1, the semiconductor device 102 can include a DC-to-DC converter 142 that can be connected to the battery 132. FIG. 1 also shows that a liquid crystal display (LCD) 146 and a light emitting diode (LED) 148 can be coupled to the semiconductor device 102. In a particular embodiment, the LCD 146 can be used to display information relevant to an audio file 120 that is listened to via the headphones 118. Moreover, the LED 148 can indicate that power to the system 100 is on or that the battery 132 for the system 100 is being charged. FIG. 1 also shows that a plurality of buttons 150 can be coupled to the semiconductor device 102. The buttons 150 can be used to control the operation of the system 100.

As shown in FIG. 1, a flash memory device 152 and a hard drive device 154 are coupled to the semiconductor device 102. In a particular embodiment, a plurality of audio files can be stored on the flash memory device 150. Further, a synchronous dynamic random access memory (SDRAM) device 156 can be coupled to the semiconductor device 102. FIG. 1 also shows that a host processor 158 and a clock 160 can be coupled to the semiconductor device 102. In a particular embodiment, the host processor 158 is a microprocessor such as an ARM core. Moreover, the clock 160 is a 24.0 MHz crystal clock in a particular embodiment.

FIG. 1 further shows that the system 100 can include a laser fuse bank 162 that is incorporated into, or otherwise disposed within, the semiconductor device 102. In a particular embodiment, the laser fuse bank 162 includes 384 laser fuses that represent 384 bits of information. The laser fuse bank 162 can include up to 512 laser fuses that represent 512 bits of information. In either case, 128 bits are dedicated to a unique identifier, e.g., a digital rights management identification (DRM ID), and the remaining bits are dedicated to other information related to the semiconductor device.

Figure 2:
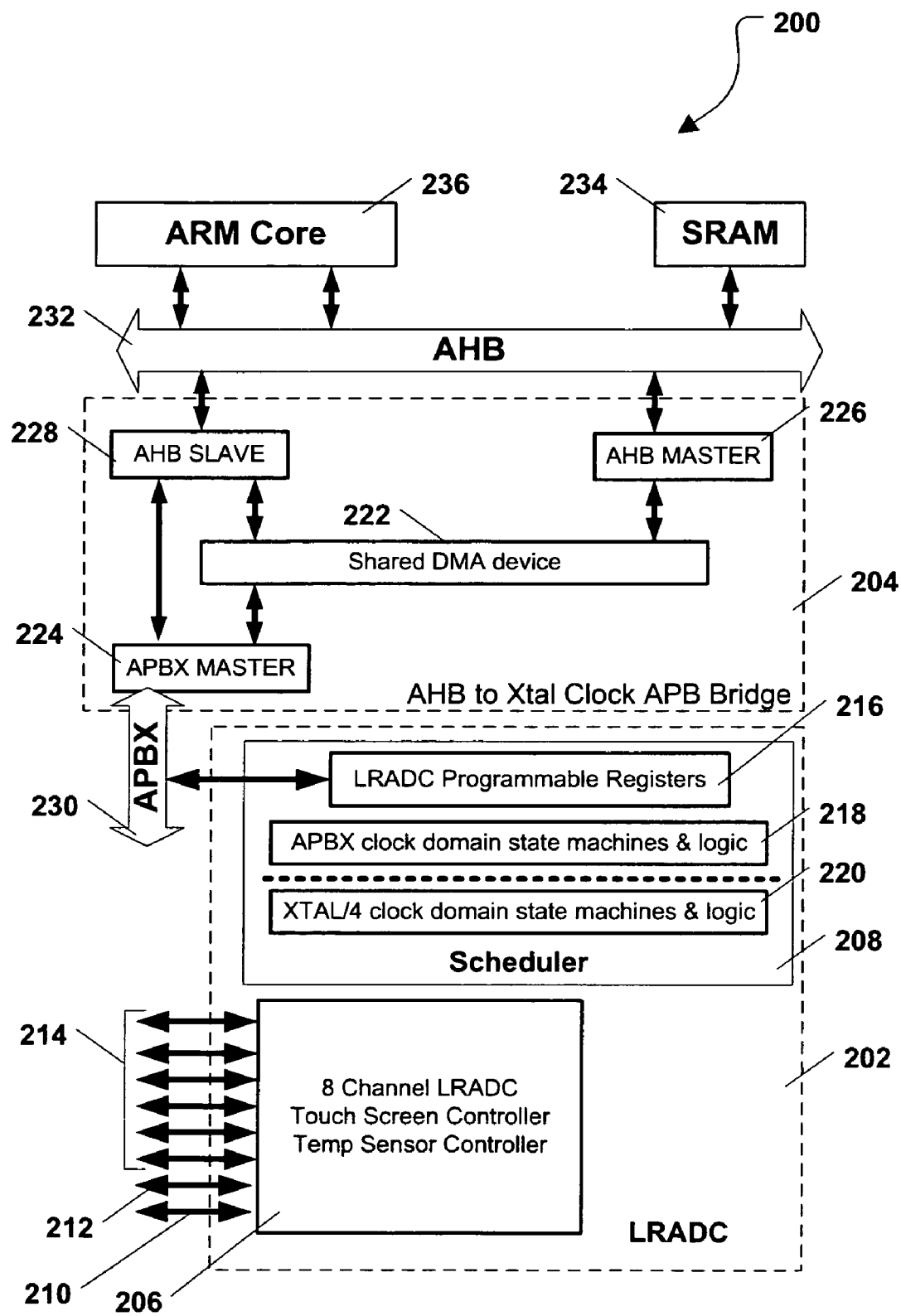
FIG. 2 is a block diagram of a low resolution analog-to-digital converter system.

Referring to FIG. 2, an exemplary, non-limiting embodiment of a low resolution analog-to-digital converter (LRADC) system is shown and is generally designated 200. As illustrated in FIG. 2, the LRADC system 200 includes an LRADC 202 and a bridge 204. In a particular embodiment, the bridge is an advanced high-performance bus (AHB) to crystal (Xtal) Clock advanced peripheral bus (APB) bridge (AHB to Xtal Clock APB bridge). As shown, the LRADC 202 includes a controller 206 and scheduler 208. Particularly, the controller 206 can include an 8 channel block, a touch screen controller, and a temperature sensor controller.

In a particular embodiment, the 8 channel low resolution LRADC block can be used for voltage measurement. A battery channel 210 can be dedicated to measure the voltage on a battery pin, and thus, a battery. A Vdd Input/Output (VddIO) rail channel 212 is dedicated to measure the voltage on a VddIO Rail (not shown). In a particular embodiment, the battery channel can be used to sense the amount of battery life remaining. Further, the VddIO Rail channel can be used to calibrate voltage levels measured on a plurality of auxiliary channels 214. The auxiliary channels can be used for a variety of different functions such as, sensing a resistor based wired remote control, temperature sensing, and touch screen sensing. Also, in a particular embodiment, the LRADC channels are accurate to 12 bits of resolution, and all channels sample on the same divided clock rate from the 24.0 MHz crystal clock.

In a particular embodiment, each channel 210, 212, 214 includes a corresponding schedule request bit, a schedule bit, an interrupt request status bit, and an interrupt enable bit that are part of an LRADC control register within the LRADC controller 206. Moreover, the LRADC controller 206 can include a result register for each channel. In a particular embodiment, the result register includes twelve bits.

In an illustrative embodiment, setting the schedule request bit causes the LRADC controller 206 to schedule an analog-to-digital conversion for the corresponding channel. Each channel schedule bit can be sequentially checked, and if scheduled, an analog-to-digital conversion will be completed for those channels scheduled. The schedule bits are cleared upon completion of a successive approximation conversion, and a corresponding interrupt request bit can be set for each channel. As such, a program can control how often a conversion is requested for each channel. Moreover, as each schedule channel is converted, a corresponding interrupt request status bit is set and a corresponding schedule bit is reset. A conversion for a particular channel can be continuously rescheduled.

Moreover, in another particular embodiment, independent threads can request conversions without needing any information from unrelated threads using other channels. Setting a schedule bit can be performed atomically and setting a "gang" of multiple channel schedule bits can also be performed atomically. For example, LRADC scheduling method can be round robin and the LRADC controller 206 can snap shot all schedule bits at once and then, process those schedule bits in sequence until all scheduled channels are converted. Then, the LRADC controller 206 can monitor the schedule bits. If any schedule bits are set, the LRADC controller 206 snap shots the scheduled bits and starts a new conversion operation for all scheduled channels. Thus, multiple schedule bits, e.g., for four channels, can be set on the same clock edge. The channel that has the highest channel number can be converted last and will have its interrupt request status bit set last. Moreover, if that channel is the only one of the four channels with an interrupt enable bit set, then it can interrupt the ARM core 236 after all four channels are converted. Thus, all four channels are effectively ganged together. Results of each conversion can be stored in a result register within the LRADC controller 206 and transmitted to the ARM core 236 when the ARM core 236 is interrupted.

Further, in a particular embodiment, the LRADC controller 206 can include an integrated touch screen controller having drive voltage generation for touch screen coordinate measurement and a touch detection interrupt circuit. The LRADC controller 206 can also include four delay control channels that can be used to automatically time and schedule control events within the LRADC 202. Additionally, all eight channels of the LRADC controller 206 can share a common successive approximation style analog to digital converter through a common analog multiplexer front end. Moreover, in a particular embodiment, the battery pin can have a built in 2:1 voltage divider on its analog multiplexer input so that it can measure battery voltages that are at a higher potential than the VddIO rail. All other channel inputs are restricted by the VddIO rail voltage.

As further shown in FIG. 2, the scheduler 208 within the LRADC 202 includes a plurality of LRADC programmable registers 216 and a first logic device 218 that includes plurality of APBX clock domain state machines and the associated logic. In a particular embodiment, the LRAD programmable registers 216 include a schedule register, a request register, and an interrupt request register. Additionally, the LRADC 202 includes a second logic device 220 that includes a plurality of XTAL/4 clock domain state machines and the associated logic. In a particular embodiment, each logic device 218, 220 includes a memory.

FIG. 2 also shows that the bridge 204 includes a shared direct memory access (DMA) device 222. An APBX master 224 is coupled to the shared DMA device 222. Further, an AHB master 226 and an AHB slave 228 are also coupled to the shared DMA device 222. As illustrated in FIG. 2, the LRADC 202 is coupled to the bridge 204 via an APBX 230. Specifically, the APBX master 224 is coupled to the LRADC programmable registers 216 via the APBX 220. FIG. 2 also shows that a bus 232 is coupled to the AHB master 226 and the AHB slave 228. In a particular embodiment, the bus 232 is an advanced high-performance bus (AHB). Additionally, a memory device 234 is coupled to the bus 232. In a particular embodiment, the memory device 234 is a static random access memory (SRAM). FIG. 2 also shows a microprocessor 236 coupled to the bus 232. In an illustrative embodiment, the microprocessor 236 is an ARM core microprocessor.

Figure 3:
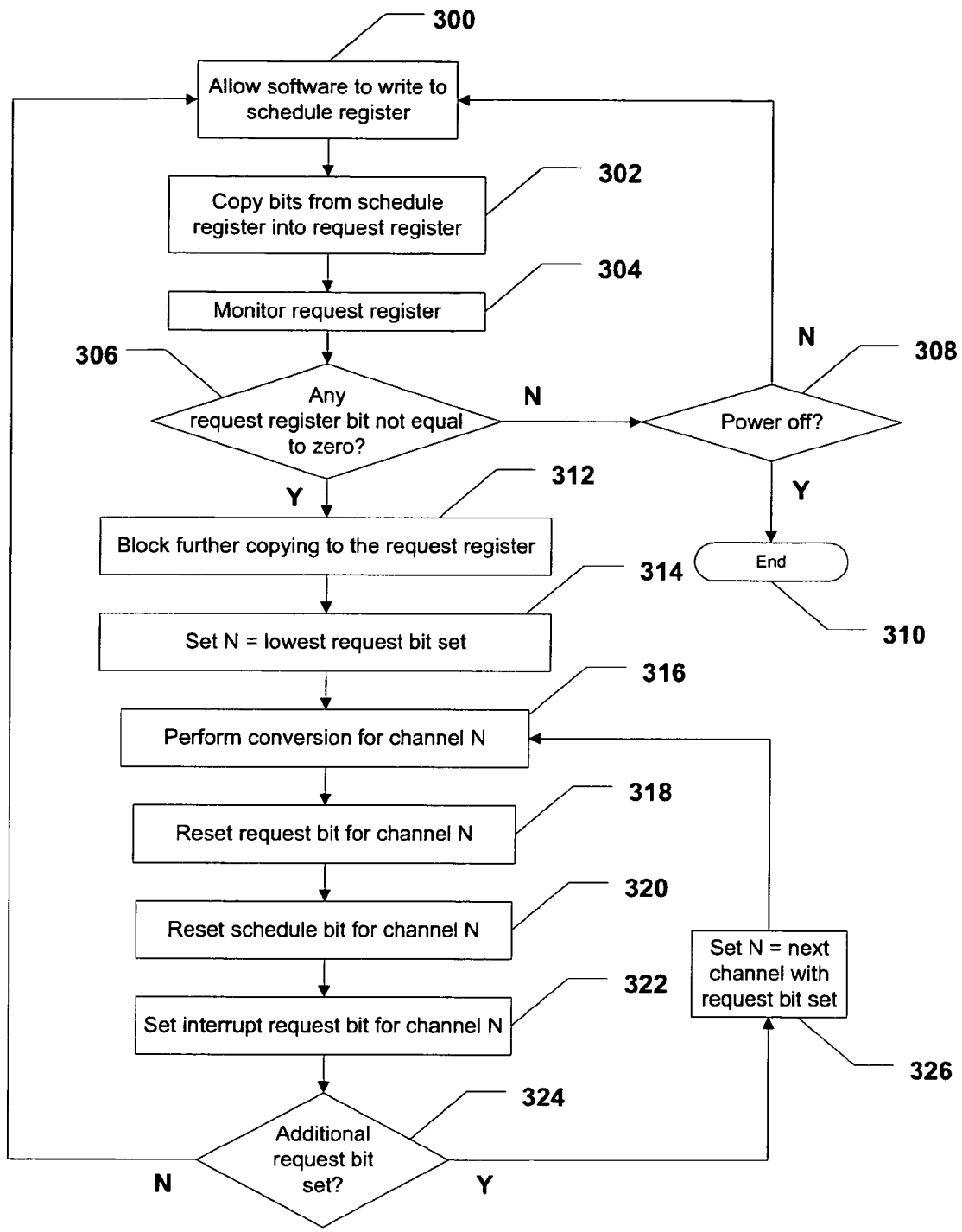
FIG. 3 is a flow chart illustrating a method for scheduling access to the low resolution analog-to-digital converter and a microprocessor.

FIG. 3 an exemplary, non-limiting embodiment of a method of operation. Beginning at block 300, one or more software applications are allowed to write to a schedule register having a plurality of schedule bits. In a particular embodiment, the schedule register includes eight schedule bits that are numbered from 0 to 7. Moving to block 302, the schedule bits are copied from the schedule register into a request register that includes a plurality of request bits. In a particular embodiment, the request register includes eight request bits numbered from 0 to 7.

Moving to block 304, the request bits are monitored. Then, at decision step 306, it is determined whether any request register bit is not equal to zero. If not, the method proceeds to decision step 308 and it is determined whether the power to the system is turned off. If so, the method ends at state 310. Otherwise, the method returns to block 300 and the method continues as described herein.

Returning to decision step 306, if any request register bit is not equal to zero, the method proceeds to block 312 and further copying to the request register is blocked. Thereafter, at block 314, a channel N is set to the lowest channel that has a request bit set. Moving to block 316, an analog-to-digital conversion is performed for the channel N. Next, at block 318, the request bit for the channel N is reset. Moving to block 320, the schedule bit for the channel N is reset. Thereafter, at block 322, an interrupt request bit for the channel N is set.

Proceeding to decision step 324, it is determined whether an additional request bit is set. If not, the method returns to block 300 and continues as described herein. On the other hand, if an additional request bit is set, the method moves to block 326 and the variable N is set equal to the next channel that has a request bit set. Then, the method returns to block 316 and continues as described herein.

With the configuration of structure described above, the system and method for scheduling access to an analog-to-digital converter and microprocessor provides increased efficiency of a system in which the scheduler is incorporated. Moreover, the microprocessor is only interrupted to receive signals from one of the components connected to the analog-to-digital converter when requested by the component. Thus, the microprocessor is used more efficiently and battery life is increased.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An analog-to-digital converter system, comprising:
   a programmable control register;
   a plurality of channels, each channel having an associated request bit within the programmable control register; and
   a scheduler responsive to the programmable control register, the scheduler comprising logic to monitor a plurality of request bits to detect when any of the request bits are set.

2. The system of claim 1, wherein the scheduler further comprises:
   logic to copy a plurality of schedule bits to the plurality of request bits; and
   logic to block further copying of the schedule bits when at least one of the plurality of request bits is set.

3. The system of claim 2, wherein each channel further comprises an associated schedule bit within the programmable control register and an associated interrupt request bit within the programmable control register.

4. A method of scheduling use of an analog-to-digital converter, the method comprising:
   copying a plurality of bits from a schedule register having a plurality of schedule bits to a request register having a plurality of request bits, wherein each of the plurality of schedule bits corresponds to a channel of an analog-to-digital converter;
   monitoring the plurality of request bits;
   determining whether at least one of the plurality of request bits is set; and
   blocking further copying to the request register after determining that at least one of the plurality of request bits is set.

5. The method of claim 4, further comprising setting a channel N to an integer value associated with a request bit that is set.

6. The method of claim 5, further comprising performing an analog-to-digital conversion for the channel N.

7. The method of claim 5, further comprising resetting a request bit associated with the channel N.

8. The method of claim 7, further comprising resetting a schedule bit associated with the channel N.

9. The method of claim 8, further comprising setting an interrupt request bit for the channel N.

10. The method of claim 9, further comprising determining whether an additional request bit is set within the request register.

11. A method, comprising:
setting a first schedule bit of a plurality of schedule bits within a schedule register, the first schedule bit corresponding to a first channel of an analog-to-digital converter (ADC) system; and
receiving a first result of a first analog-to-digital conversion performed for the first channel when a scheduler of the ADC system blocks copying to a request register after determining that at least one of a plurality of request bits within the request register is set.

12. The method of claim 11, wherein the first channel is one channel of a plurality of channels of the ADC system.

13. The method of claim 12, wherein the scheduler copies the first schedule bit to the request register before the scheduler blocks copying to the request register.

14. The method of claim 11, further comprising:
setting a second schedule bit of the plurality of schedule bits concurrently with setting the first schedule bit, the second schedule bit corresponding to a second channel of the ADC system; and
receiving a second result of a second analog-to-digital conversion performed for the second channel after the scheduler copies both of the first schedule bit and the second schedule bit to the request register and blocks further copying to the request register.

15. The method of claim 14, wherein the first result is received from a first result register of a plurality of result registers of the ADC system, and wherein the second result is received from a second result register of the plurality of result registers.

16. The method of claim 15, further comprising:
setting a single interrupt enable bit within an interrupt enable register concurrently with setting the first schedule bit and the second schedule bit.

17. The method of claim 16, wherein both of the first analog-to-digital conversion and the second analog-to-digital conversion are preformed before either of the first result or the second result is received.

18. A method of performing an analog-to-digital conversion, comprising:
receiving a request to schedule an analog-to-digital conversion for a channel of a plurality of channels;
scheduling an analog-to-digital conversion in response to receiving the request;
performing the analog-to-digital conversion based on the request; and
wherein data that indicates the request to schedule is stored in a programmable control register.

19. The method of claim 18, further comprising setting a schedule bit within a schedule register associated with the channel.

20. The method of claim 19, further comprising copying a plurality of bits from the schedule register to a request register having a plurality of request bits.

* * * * *